US008660068B2

(12) United States Patent
Chun et al.

(10) Patent No.: US 8,660,068 B2
(45) Date of Patent: *Feb. 25, 2014

(54) METHOD FOR SENDING STATUS INFORMATION IN MOBILE TELECOMMUNICATIONS SYSTEM AND RECEIVER OF MOBILE TELECOMMUNICATIONS

(71) Applicant: LG Electronics Inc., Seoul (KR)

(72) Inventors: Sung-Duck Chun, Anyang (KR); Seung-June Yi, Anyang (KR); Sung-Jun Park, Anyang (KR); Young-Dae Lee, Anyang (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/914,195

(22) Filed: Jun. 10, 2013

(65) Prior Publication Data
US 2013/0272203 A1 Oct. 17, 2013

Related U.S. Application Data

(63) Continuation of application No. 13/585,659, filed on Aug. 14, 2012, which is a continuation of application No. 12/363,007, filed on Jan. 30, 2009, now Pat. No. 8,270,348.

(60) Provisional application No. 61/025,267, filed on Jan. 31, 2008.

(30) Foreign Application Priority Data

Jan. 23, 2009 (KR) .................. 10-2009-0006356

(51) Int. Cl.
H04W 4/00 (2009.01)
H04W 28/04 (2009.01)
H04L 1/16 (2006.01)
H04L 1/18 (2006.01)
H04W 28/06 (2009.01)

(52) U.S. Cl.
CPC ............ *H04W 28/04* (2013.01); *H04L 1/1685* (2013.01); *H04L 1/187* (2013.01); *H04W 28/06* (2013.01)
USPC .......................... 370/328; 455/403; 455/438

(58) Field of Classification Search
None
See application file for complete search history.

(56) References Cited

U.S. PATENT DOCUMENTS 6,557,135 B1    4/2003   Balachandran et al.
6,594,240 B1    7/2003   Chuah et al.
(Continued)

FOREIGN PATENT DOCUMENTS

CN      1549610 A      11/2004
CN      101090281 A    12/2007
(Continued)

OTHER PUBLICATIONS

"Digital cellular telecommunications system (Phase 2+); Functional stage 2 description of Location Services (LCS) in GERAN," 3GPP TS 43.059 Version 7.3.0 Release 7, Sophia Antipolis Cedex, France, May 2007, 63 pages, XP014038519.

(Continued)

*Primary Examiner* — Ian N Moore
*Assistant Examiner* — Brian T Le
(74) *Attorney, Agent, or Firm* — Birch, Stewart, Kolasch & Birch, LLP

(57) ABSTRACT

Discussed is a method of sending status information (STATUS PDU) in which a receiving side reports a data received state to a transmitting side in a mobile telecommunication system. A receiving side RLC entity considers an available radio resource to construct a status PDU fit to the size of the radio resource and then sends the constructed status PDU to a transmitting side RLC entity, thereby avoiding a deadlock situation of RLC protocols.

16 Claims, 9 Drawing Sheets

(56) References Cited

U.S. PATENT DOCUMENTS

| | | |
|---|---|---|
| 6,728,918 B1 | 4/2004 | Ikeda et al. |
| 6,862,450 B2 | 3/2005 | Mikola et al. |
| 6,874,113 B2 | 3/2005 | Chao et al. |
| 6,967,936 B1 | 11/2005 | Laroia et al. |
| 7,154,873 B2 | 12/2006 | Yi |
| 7,180,885 B2 | 2/2007 | Terry |
| 7,181,667 B2 | 2/2007 | Argyropoulos et al. |
| 7,227,856 B2 | 6/2007 | Wu |
| 7,227,857 B2 | 6/2007 | Kuo |
| 7,227,868 B2 | 6/2007 | Inden |
| 7,295,573 B2 | 11/2007 | Yi et al. |
| 7,486,699 B2 | 2/2009 | Yi et al. |
| 7,821,979 B2 | 10/2010 | Lee et al. |
| 7,894,444 B2 | 2/2011 | Lohr et al. |
| 2001/0053140 A1 | 12/2001 | Choi et al. |
| 2002/0001314 A1 | 1/2002 | Yi et al. |
| 2002/0009999 A1 | 1/2002 | Lee et al. |
| 2002/0042270 A1 | 4/2002 | Yi |
| 2002/0122411 A1 | 9/2002 | Zimmerman et al. |
| 2003/0007490 A1 | 1/2003 | Yi et al. |
| 2003/0099305 A1 | 5/2003 | Yi et al. |
| 2003/0194992 A1 | 10/2003 | Kim et al. |
| 2004/0103435 A1 | 5/2004 | Yi et al. |
| 2004/0146019 A1 | 7/2004 | Kim et al. |
| 2004/0147236 A1 | 7/2004 | Parkvall et al. |
| 2004/0156330 A1 | 8/2004 | Yi et al. |
| 2004/0235447 A1 | 11/2004 | Gronberg et al. |
| 2005/0020260 A1 | 1/2005 | Jeong et al. |
| 2005/0047416 A1 | 3/2005 | Heo et al. |
| 2005/0054365 A1 | 3/2005 | Ahn et al. |
| 2005/0096017 A1 | 5/2005 | Kim |
| 2005/0118992 A1 | 6/2005 | Jeong et al. |
| 2005/0169293 A1 | 8/2005 | Zhang et al. |
| 2005/0213605 A1 | 9/2005 | Kim et al. |
| 2005/0250526 A1 | 11/2005 | Lindoff et al. |
| 2005/0254467 A1 | 11/2005 | Li et al. |
| 2005/0259662 A1 | 11/2005 | Kim et al. |
| 2005/0287957 A1 | 12/2005 | Lee et al. |
| 2006/0067238 A1 | 3/2006 | Olsson et al. |
| 2006/0067289 A1 | 3/2006 | Lee et al. |
| 2006/0072494 A1 | 4/2006 | Matusz |
| 2006/0072503 A1 | 4/2006 | Kim et al. |
| 2006/0084389 A1 | 4/2006 | Beale et al. |
| 2006/0154680 A1 | 7/2006 | Kroth et al. |
| 2006/0165045 A1 | 7/2006 | Kim et al. |
| 2006/0182065 A1 | 8/2006 | Petrovic et al. |
| 2006/0203780 A1 | 9/2006 | Terry |
| 2006/0233200 A1 | 10/2006 | Fifield et al. |
| 2006/0251027 A1 | 11/2006 | Chun et al. |
| 2006/0251105 A1 | 11/2006 | Kim et al. |
| 2006/0268798 A1 | 11/2006 | Kim et al. |
| 2006/0280145 A1 | 12/2006 | Revel et al. |
| 2007/0032255 A1 | 2/2007 | Koo et al. |
| 2007/0041397 A1 | 2/2007 | Hwang |
| 2007/0060139 A1 | 3/2007 | Kim et al. |
| 2007/0079207 A1 | 4/2007 | Seidel et al. |
| 2007/0081513 A1 | 4/2007 | Torsner |
| 2007/0091810 A1 | 4/2007 | Kim et al. |
| 2007/0104141 A1 | 5/2007 | Park et al. |
| 2007/0201397 A1 | 8/2007 | Zhang |
| 2007/0268861 A1 | 11/2007 | Diachina et al. |
| 2007/0274278 A1 | 11/2007 | Choi et al. |
| 2007/0297360 A1 | 12/2007 | Joachim et al. |
| 2008/0037588 A1 | 2/2008 | Yi |
| 2008/0051098 A1 | 2/2008 | Rao |
| 2008/0064444 A1 | 3/2008 | Yi |
| 2008/0084851 A1 | 4/2008 | Kim et al. |
| 2008/0146242 A1 | 6/2008 | Alanara et al. |
| 2008/0182609 A1 | 7/2008 | Somasundaram et al. |
| 2008/0186936 A1 | 8/2008 | Chun et al. |
| 2008/0186944 A1 | 8/2008 | Suzuki et al. |
| 2008/0198869 A1 | 8/2008 | Jiang |
| 2008/0233940 A1 | 9/2008 | Jen |
| 2008/0294958 A1 | 11/2008 | Lee et al. |
| 2008/0305819 A1 | 12/2008 | Chun et al. |
| 2009/0046695 A1 | 2/2009 | Jiang |
| 2009/0104890 A1 | 4/2009 | Wang et al. |
| 2009/0156194 A1 | 6/2009 | Meylan |
| 2009/0175163 A1 | 7/2009 | Sammour et al. |
| 2010/0014466 A1 | 1/2010 | Meyer et al. |
| 2010/0142457 A1 | 6/2010 | Chun et al. |

FOREIGN PATENT DOCUMENTS

| | | |
|---|---|---|
| EP | 1 343 267 A2 | 9/2003 |
| EP | 1508992 A2 | 2/2005 |
| EP | 1689130 A1 | 8/2006 |
| EP | 1768297 A2 | 3/2007 |
| EP | 1796405 A1 | 6/2007 |
| EP | 2026523 A1 | 2/2009 |
| JP | 6-53921 A | 2/1994 |
| JP | 2002-198895 A | 7/2002 |
| JP | 2003-516021 A | 5/2003 |
| JP | 2007-312244 A | 11/2007 |
| JP | 2010-518683 A | 5/2010 |
| KR | 10-2001-0045783 A | 6/2001 |
| KR | 10-2001-0062306 A | 7/2001 |
| KR | 10-2002-0004645 A | 1/2002 |
| KR | 10-0365356 B1 | 12/2002 |
| KR | 10-2003-0060055 A | 7/2003 |
| KR | 10-2003-0068743 A | 8/2003 |
| KR | 10-2003-0087914 A | 11/2003 |
| KR | 10-2004-0034398 A | 4/2004 |
| KR | 10-2004-0039944 A | 5/2004 |
| KR | 10-2004-0072961 A | 8/2004 |
| KR | 10-2005-0022988 A | 3/2005 |
| KR | 10-2005-0081836 A | 8/2005 |
| KR | 10-2005-0099472 A | 10/2005 |
| KR | 10-2005-0100882 A | 10/2005 |
| KR | 10-2005-0103127 A | 10/2005 |
| KR | 10-2005-0118591 A | 12/2005 |
| KR | 10-2006-0004935 A | 1/2006 |
| KR | 10-2006-0014910 A | 2/2006 |
| KR | 10-2006-0029452 A | 4/2006 |
| KR | 10-2006-0042858 A | 5/2006 |
| KR | 10-2006-0069378 A | 6/2006 |
| KR | 10-2006-0079784 A | 7/2006 |
| KR | 10-2006-0090191 A | 8/2006 |
| KR | 10-2006-0115175 A | 11/2006 |
| KR | 10-2006-0134058 A | 12/2006 |
| KR | 10-2007-0037979 A | 4/2007 |
| KR | 10-2007-0048552 A | 5/2007 |
| KR | 10-2007-0076374 A | 7/2007 |
| WO | WO 01/67664 A2 | 9/2001 |
| WO | WO 03/094554 A1 | 11/2003 |
| WO | WO 2004/042953 A1 | 5/2004 |
| WO | WO 2004/042963 A1 | 5/2004 |
| WO | WO 2005/039108 A2 | 4/2005 |
| WO | WO 2005/122441 A1 | 12/2005 |
| WO | WO 2006/052086 A2 | 5/2006 |
| WO | WO 2006/118418 A2 | 11/2006 |
| WO | WO 2007/024065 A1 | 3/2007 |
| WO | WO 2007/039023 A1 | 4/2007 |
| WO | WO 2007/052900 A1 | 5/2007 |
| WO | WO 2007/078156 A2 | 7/2007 |
| WO | WO 2007/078164 A1 | 7/2007 |
| WO | WO 2007/078173 A1 | 7/2007 |
| WO | WO 2007/078174 A1 | 7/2007 |
| WO | WO 2007/089797 A2 | 8/2007 |
| WO | WO 2007/091831 A2 | 8/2007 |
| WO | WO 2007/126793 A2 | 11/2007 |
| WO | WO 2007/147431 A1 | 12/2007 |
| WO | WO 2008/004725 A1 | 1/2008 |
| WO | WO 2008/094120 A1 | 8/2008 |

OTHER PUBLICATIONS

3GPP, "3rd Generation Partnership Project; Technical Specification Group Radio Access Network; Eveolved Universal Terrestrial Radio Access (E-UTRA) Radio Link Control (RLC) protocol specification (Release 8)", 3GPP TS 36.322, V8.0.0, Dec. 2007, pp. 1-14.

Alcatel-Lucent, "Format for RACH Message 2", 3GPP TSG RAN WG2 #60bis, R2-080176, Jan. 14-18, 2008, p. 1-6.

(56) References Cited

OTHER PUBLICATIONS

Catt, Ritt, "Consideration on UL Buffer Reporting" 3GPP TSG-RAN WG2 #55, R2-062934, [Online], Oct. 9, 2006, pp. 1-3, XP002513924, ISSN: 9, Retrieved from the Internet: URL: http://www.3gpp.org/ftp/tsg_ran/WG2_RL2/TSGR2_55/Documents/> [retrieved on Feb. 5, 2009].

Ericsson, "Clarification to the handling of large RLC status reports", 3GPP TSG-RAN2 Meeting #61bis, R2-082018, Mar. 31-Apr. 4, 2008, pp. 1-4.

Ericsson, "Scheduling Request in E-UTRAN," 3GPP TSG-RAN WG2 #47bis, Sorrento, Italy, R1-070471, Jan. 15-19, 2007, XP050104502, 11 pages (retrieved Jan. 10, 2007).

Ericsson, "RLC status report format", TSG-RAN WG2 Meeting #60, Tdoc R2-074701, Nov. 5-9, 2007, 3 pages provided.

Ghosh et al., Random Access Design for UMTS Air-Interface Evolution, pp. 1041-1045, downloaded on Feb. 17, 2009.

Kashima, Method And Apparatus For Providing Timing Alighnment, U.S. Appl. No. 60/944,662, filed Jun. 18, 2007.

LG Electronics Inc., "UE state transition in LTE_ACTIVE," 3GPP TSG-RAN WG2 #52, Athens, Greece, R2-061002, Mar. 27-31, 2006, XP050130928, 3 pages (retrieved Mar. 23, 2006).

LG Electronics Inc., NTT Docomo, "ACK_SN setting for short Status PDU", 3GPP TSG-RAN WG2 #62, R2-082133, May 5-May 9, 2008, pp. 1-2.

MAC Rapporteurs (Ericsson, Qualcomm Europe), "E-UTRA MAC Protocol specification update", #3GPP TSG-RAN2 Meeting #60bis, R2-080631, Jan. 14-18, 2008, p. 1-25.

Motorola, "Contention-free Intra-LTE Handover," 3GPP TSG-RAN WG2 #57, St. Louis, USA, R2-070730, Feb. 12-16, 2007, XP050133763, 3 pages (retrieved Feb. 9, 2007).

Motorola, "Design of Backoff scheme for LTE", 3GPP TSG-RAN-WG2 Meeting #56bis, Tdoc R2-070143, Jan. 15-19, 2007, p. 1-3.

NEC, "Optimised Buffer Status Reporting", 3GPP TSG-RAN WG2#58bis Meeting, Orlando USA, Jun. 25-29, 2007; Jun. 25, 2007, [Online], vol. R2-072515, Jun. 20, 2007, pp. 1-6, XP002503220 Retrieved from the Internet: URL: www.3gpp.org>.

NTT Docomo, Inc., "Miscellaneous corrections to TS 36.322", 3GPP TSG-RAN2 Meeting #61bis, R2-081700, Mar. 31-Apr. 4, 2008, pp. 1-13.

Sammour et al., "Method and Apparatus of Performing Packet Data Convergence Protocol Reset," U.S. Appl. No. 61/019,058, filed Jan. 4, 2008.

Texas Instruments, "UL Synchronization Management and Maintenance in E-UTRA," 3GPP TSG RAN WG1 #49, Kobe, Japan, R1-072198, May 7-11, 2007, XP050105936, 7 pages (retrieved May 1, 2007).

Texas Instruments, "UL Synchronization Management in LTE_ACTIVE," 3GPP TSG RAN WG1 #48bis, St. Julians, Malta, R1-071478, Mar. 26-30, 2007, XP050105413, 4 pages (retrieved Mar. 21, 2007).

Wang et al., "Operation of Control Protocol Data Units in Packet Data Covergence Protocol," U.S. Appl. No. 60/976,139, filed Sep. 28, 2007.

Wu et al., Enhanced Random Access Response Formats in E-UTRAN, U.S. Appl. No. 61/006,348, filed Jan. 8, 2008.

ZTE, "Redundant retransmission restraint in RLC-AM," 3GPP TSG-RAN WG2 meeting #53, Shanghai, China, May 2006, pp. 1-5, XP050131180.

QUALCOMM Europe, "L2 improvements and polling", 3GPP TSG-RAN WG2 #58, R2-072021, Kobe, Japan, May 7-11, 2007, pp. 1-3.

European Search Report for Application No. 09151792.0-1851 / 2086148 dated Nov. 7, 2013.

3GPP TS 36.321 V8.0.0 (Dec. 2007), "Technical Specification Group Radio Access Network; Evolved Universal Terrestrial Radio Access (E-UTRA) Medium Access Control (MAC) Protocol Specification," XP-002520880, pp. 1-23.

LG Electronics, "Discussion on random access back-off procedure," 3GPP TSG-RAN WG2 #60bis, R2-080189, Sevilla, Spain, Jan. 14-18, 2008, XP-050138064, pp. 1-5.

LG Electronics, Inc, "RACH procedure," 3GPP TSG-RAN WG2 #59, R2-073043, Aug. 19-24, 2007, Athens, Greece, XP-002515770, pp. 1-3.

Romain Masson, "E-UTRA RACH within the LTE system," Thesis submitted in fulfillment of the requirements for the award of the degree of Master of Engineering Research . . . Feb. 3, 2006, XP-002448009, pp. 1-82.

FIG.4

| | | | | |
|---|---|---|---|---|
| D/C | CPT | | ACK_SN | Oct 1 |
| ACK_SN | | | E1 | Oct 2 |
| NACK_SN | | | | Oct 3 |
| E1 | E2 | NACK_SN | | Oct 4 |
| NACK_SN | | E1 | E2 | Oct 5 |
| SOstart | | | | Oct 6 |
| SOstart | | | SOend | Oct 7 |
| SOend | | | | Oct 8 |
| SOend | | NACK_SN | | Oct 9 |
| ... | | | | |

METHOD FOR SENDING STATUS INFORMATION IN MOBILE TELECOMMUNICATIONS SYSTEM AND RECEIVER OF MOBILE TELECOMMUNICATIONS

CROSS REFERENCE TO RELATED APPLICATIONS

The present application is a 37 C.F.R. §1.53(b) continuation of U.S. patent application Ser. No. 13/585,659 filed Aug. 14, 2012, which is a continuation of U.S. patent application Ser. No. 12/363,007 filed on Jan. 30, 2009, now U.S. Pat. No. 8,270,348, which claims priority benefits of U.S. Provisional Application No. 61/025,267 filed on Jan. 31, 2008 and Korean Patent Application No. 10-2009-0006356 filed on Jan. 23, 2009 in Republic of Korea. The entire contents of all of the above applications are hereby incorporated by reference.

BACKGROUND OF THE INVENTION

1. Field of the Invention

The present invention relates to a radio protocol in a mobile communication system, and more particularly, a method for sending status information (STATUS PDU) in which a receiving side reports a data received state to a transmitting side, in an evolved universal mobile telecommunications system (E-UMTS) evolved from the UMTS.

2. Discussion of the Background Art

FIG. 1 is a network architecture of a long term evolution (LTE) system which is the related art mobile communication system has evolved from the existent UMTS system and a basic standardization therefor is undergoing in 3GPP.

The LTE network may be divided into evolved UMTS terrestrial radio access network (E-UTRAN) and core network (CN). The E-UTRAN includes a terminal (User Equipment; UE), a base station (Evolved Node B; eNB), an access gateway (aGW) located at the end of the network to be connected to an external network. The aGW may be divided into a portion of handling a user traffic and a portion of processing a control traffic. Here, a new interface may be used for the communication between the aGW for processing the user traffic and the aGW for processing the control traffic. One or more cells may exist in one eNB. An interface for transmission of the user traffic or control traffic may be used between eNBs. The CN may include an aGW, a node for a user registration of other UEs and the like. An interface may be used to identify the E-UTRAN and CN.

FIG. 2 is an architecture of a radio interface protocol control plane between a terminal and an E-UTRAN based upon the 3GPP radio access network standard, and FIG. 3 is an architecture of a radio interface protocol user plane between a terminal and an E-UTRAN based upon the 3GPP radio access network standard.

Hereinafter, the architecture of radio interface protocols between the terminal and the E-UTRAN will be described with reference to FIGS. 2 and 3.

The radio interface protocol has horizontal layers comprising a physical layer, a data link layer and a network layer, and has vertical planes comprising a user plane for transmitting data information and a control plane for transmitting a control signaling. The protocol layers can be divided into a first layer (L1), a second layer (L2) and a third layer (L3) based on three lower layers of an Open System Interconnection (OSI) standard model widely known in communications systems. Such radio interface protocols may exist as a pair between the terminal and the E-UTRAN, to manage data transmissions over interfaces.

Hereinafter, each layer in the radio protocol control plane in FIG. 2 and the radio protocol user plane in FIG. 3 will be described.

A first layer, as a physical (PHY) layer, provides an information transfer service to an upper layer using a physical channel. The physical layer is connected to its upper layer, called a Medium Access Control (MAC) layer, via a transport channel. The MAC layer and the physical layer exchange data via the transport channel. Here, the transport channels may be divided into a dedicated transport channel and a common transport channel depending on whether the transport channel is shared. Data is transferred via a physical channel between different physical layers, namely, between the physical layer of a transmitting side and the physical layer of a receiving side.

Various layers exist in the second layer. First, a medium access control (MAC) layer serves to map different logical channels to different transport channels, and also performs a logical channel multiplexing for mapping several logical channels to one transport channel. The MAC layer is connected to an upper radio link control (RLC) layer via a logical channel. Logical channels are divided according to a type of information to be transmitted into a control channel for transmitting control plane information and a traffic channel for transmitting user plane information.

The RLC layer of the second layer manages segmentation and concatenation of data received from an upper layer to appropriately adjust a data size such that a lower layer can send data over an interface. Also, the RLC layer provides three operation modes, including a transparent mode (TM), an un-acknowledged mode (UM) and an acknowledged mode (AM), so as to guarantee various quality of service (QoS) requirements of each radio bearer (RB). In particular, the RLC layer operating in the AM mode (hereinafter, referred to as AM RLC layer) performs a retransmission using an automatic repeat and request (ARQ) function for a reliable data transmission.

A packet data convergence protocol (PDCP) layer located at the second layer is used to efficiently transmit IP packets, such as IPv4 or IPv6, on a radio interface with a relatively narrow bandwidth. For this purpose, the PDCP layer reduces the size of an IP packet header which is relatively great in size and includes unnecessary control information, namely, performs a function called header compression. Accordingly, only necessary information can be included in the header part of data for transmission, so as to increase a transmission efficiency of a radio interface.

A radio resource control (RRC) layer located at the lowermost portion of the third layer is only defined in the control plane. The RRC layer controls logical channels, transport channels and physical channels in relation to configuration, re-configuration and release of Radio Bearers (RBs). Here, the RB denotes a logical path that the L2 layer provides for data transmission between the terminal and the UTRAN. In general, the establishment of the RB refers to stipulating the characteristics of protocol layer and channel required for providing a specific service, and setting the respective detailed parameters and operation methods. The RBs are divided into a signaling RB (SRB) and a data RB (DRB). The SRB is used as a path for transmission of RRC messages in the C-plane, while the DRB is used as a path for transmissions of user data in the U-plane.

Hereinafter, the RLC layer will be described in more detail. The RLC layer provides three modes, such as the TM, UM and AM, as mentioned above. The RLC layer rarely performs a function in the TM, and thus UM and AM will only be described herein. The UM RLC adds a protocol data unit (PDU) header including a sequence number (SN) to each PDU for transmission, such that a receiving side can be known as to which PDU has been lost during transmission. Due to such function, the UM RLC manages, in the user plane, the transmission of multimedia data or the transmission of real-time packet data, such as voice (e.g., VoIP) or streaming in a packet service domain (hereinafter, referred to as a PS domain), while managing, in the control plane, the transmission of an RRC message, which does not need a reception acknowledgement, among RRC messages sent to a specific terminal or specific terminal group within a cell.

Similarly, the AM RLC constructs a PDU by adding a PDU header including an SN upon the construction of PDU. Unlike the UM RLC, a receiving side acknowledges a PDU sent by a transmitting side. The receiving side acknowledges in order to request a retransmission of unsuccessfully received PDU from the transmitting side. Such retransmission function is the most important characteristic of the AM RLC. Thus, the AM RLC aims to guarantee an error-free data transmission via the retransmission. Under the purpose, the AM RLC usually manages a non-real-time packet data transmission, such as TCP/IP of PS domain, in the user plane, while managing a transmission of RRC message, which requires a reception acknowledgement, among RRC messages transmitted to a specific terminal within a cell in the control plane.

From the perspective of direction, the UM RLC is used for a uni-directional communication, while the AM RLC is used for a bi-directional communication due to a feedback from a receiving side. From the structural perspective, there is a difference, namely, the UM RLC is configured such that one RLC entity performs transmission or reception while the AM RLC is configured such that both transmitting side and receiving side exist in one RLC entity. The complicated configuration of the AM RLC is due to the retransmission. The AM RLC includes a retransmission buffer for managing the retransmission, in addition to a transmission/reception buffer. Also, the AM RLC performs various functions, such as using transmitting and receiving windows for a flow control, polling for a transmitting side to request status information from a receiving side of an RLC entity, sending a status report for a receiving side to report its buffer state to a transmitting side of a peer RLC entity, constructing a status PDU for delivering status information, and the like. The AM RLC also needs various protocol parameters, such as status variables and a timer, in order to support the functions. A PDU, such as status report or status PDU, which is used for controlling the data transmission in the AM RLC, is referred to as 'Control PDU', and a PDU used for transferring user data is referred to as 'Data PDU'.

An RLC data PDU in the AM RLC may be divided into AMD PDU and AMD PDU segment, in detail. The AMD PDU segment has part of data included in the AMD PDU. In the LTE system, a maximum size of a data block is changeable every time a terminal sends the data block. Hence, after a transmitting side AM RLC entity constructs a 200-byte AMD PDU at a specific time and transmits the constructed AMD PDU, when the transmitting side AM RLC receives NACK from a receiving side AM RLC and thereby tries to retransmit the AMD PDU, if a maximum size of data block to be actually transmittable is 100 bytes, the same AMD PDU cannot be sent as it is. In this case, the AMD PDU segment is used. The AMD PDU segment denotes that the corresponding AMD PDU is segmented into smaller units. During the procedure, the transmitting side AM RLC entity divides the AMD PDU into the AMD PDU segments and transmits the AMD PDU segments over several transmission time intervals. The receiving side AM RLC entity then restores the AMD PDU from the received AMD PDU segments.

If there is unsuccessfully (incompletely or incorrectly) received data, the receiving side AM RLC requests a retransmission of such data from the transmitting side AM RLC, which is referred to as 'status report'. The status report is sent by using STATUS PDU, which is one of control PDUs.

BRIEF DESCRIPTION OF THE DRAWINGS

FIG. 4 is a format of STATUS PDU currently used in the LTE system;

DETAILED DESCRIPTION

Figure 1:
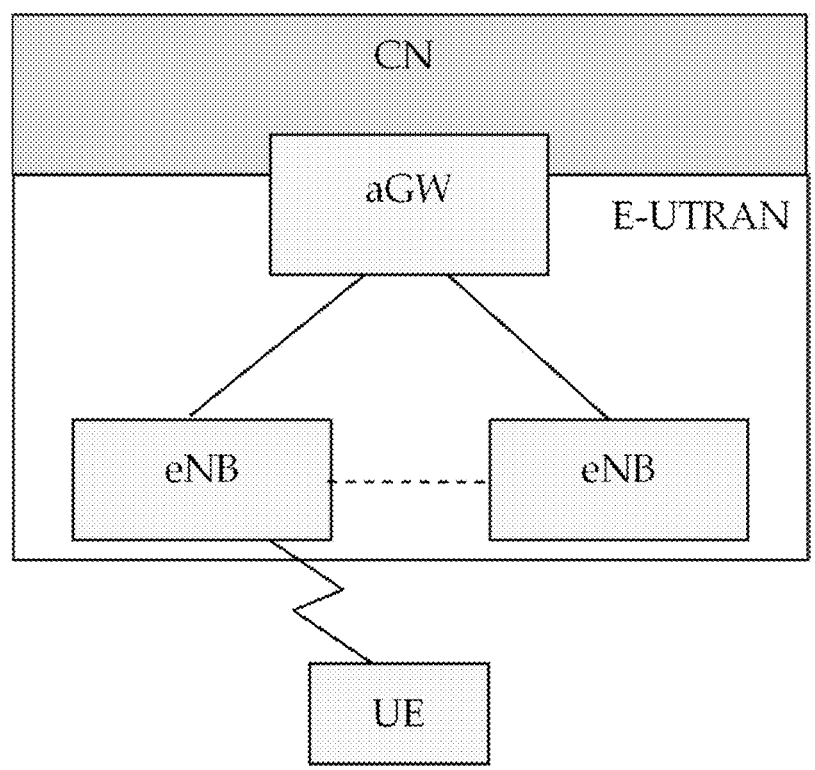
FIG. 1 is a network architecture of a long term a long term evolution (LTE) system which is the related art mobile communication system.
Figure 2:
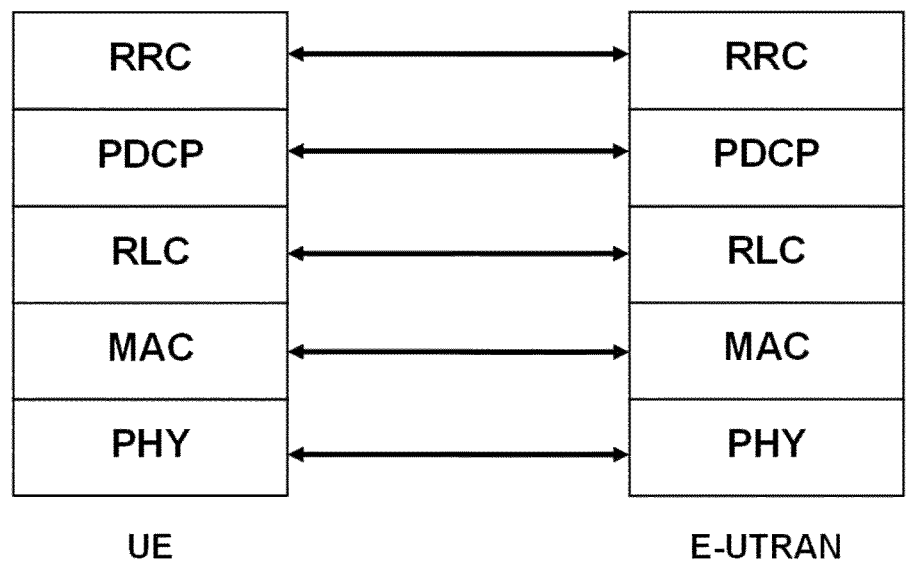
FIG. 2 is an architecture of a radio interface protocol control plane between a terminal and an E-UTRAN based upon the 3GPP radio access network standard.
Figure 3:
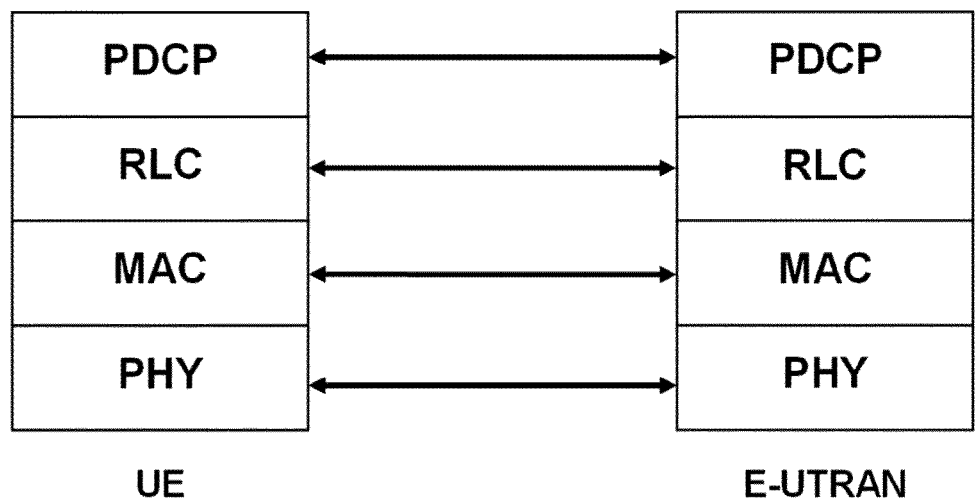
FIG. 3 is an architecture of a radio interface protocol user plane between a terminal and an E-UTRAN based upon the 3GPP radio access network standard.

In the related art, when the status report is triggered, the receiving side AM RLC includes all information related to AMD PDUs, which fall within the range of VR(R) (e.g., a start point of a transmitting window) to VR(MS) (e.g., an end point of the transmitting window), in a STATUS PDU for transmission. However, if the size of radio resource to send the STATUS PDU is smaller than the STATUS PDU, the constructed STATUS PDU cannot be sent. Actually, a radio resource allocation for a specific logical channel is managed by a MAC layer. However, the MAC layer does not know the condition of the RLC. Accordingly, the MAC layer may allocate radio resources less than being required for the transmission of the RLC STATUS PDU. The related art does not concern about the situation. As a result, when such situation occurs, the RLC STATUS PDU cannot be sent, thereby coming to a deadlock situation.

Therefore, an object of the present invention is to prevent an RLC protocol from being in a deadlock situation, by allowing a transmission of a STATUS PDU even when the size of an available radio resource is smaller than the STATUS PDU, in case where a receiving side RLC sends the STATUS PDU to a transmitting side RLC. To this end, the present invention proposes different embodiments depending on how to set ACK_SN.

To achieve the object of the present invention, there is provided a method for sending status information in mobile telecommunications, including: constructing a status protocol data unit (PDU), the status PDU being used to provide positive and/or negative acknowledgements of acknowledged mode data (AMD) PDUs or portions of AMD PDUs (=RLC data PDUs); and transmitting the constructed status PDU to a peer RLC entity (or lower layer), wherein the constructing step is performed by considering available resources such that the constructed status PDU fits to the total size of the available resources.

The constructing step may further include: including NACK elements in increasing sequence number order; and including information indicating up to which AMD PDUs the status information is included in the status PDU.

The information may refer to ACK_SN, the ACK_SN being set to the SN of the next not completely received AMD PDU which is not indicated with a NACK_SN in the status PDU.

The NACK elements may be included in increasing sequence number order from the first not received AMD PDU or portions of AMD PDU up to a certain not received AMD PDU such that the constructed status PDU fits to the total size of the available resources.

The not received AMD PDU or portions of AMD PDUs may not exist between two consecutive not received PDUs.

The not received AMD PDU or portions of AMD PDU may be allowed to exist in between two consecutive not received PDUs.

The available resources may refer to the total size of RLC PDUs indicated by lower layer.

The method may further include receiving an indication from a lower layer (MAC) about the total size of RLC PDUs.

The constructing step may be performed by including a NACK_SN element of a first not received AMD PDU or portions of AMD PDUs and optionally further including at least one NACK_SN element of other not received AMD PDUs or portions of AMD PDUs.

The NACK_SN element may include a NACK_SN and optionally a SOstart and a SOend.

If the status PDU is a partial status PDU, an indicator may be used to indicate that the status PDU is the partial status PDU.

In another aspect of the present invention, there is provided a method for sending status information in mobile telecommunications, in a method of delivering status information in which a receiving side radio link control (RLC) entity reports a data (data protocol units, PDUs) received state to a transmitting side RLC entity, the method including: constructing by the receiving side RLC entity a STATUS PDU including information related to a reception state of RLC data PDUs by considering an available radio resource; and transmitting by the receiving side RLC entity the constructed STATUS PDU to the transmitting side RLC entity, wherein the constructing step may include: selectively including incorrectly received NACK _SNs as many as being transmittable by using the available radio resource; and setting a value of ACK_SN to a value of VR(MS).

In one aspect of the present invention, there is provided a receiving side radio link control (RLC) entity in mobile telecommunications comprising a module configured to: check a currently available radio resource; construct a STATUS protocol data unit (PDU) by considering the available radio resource, wherein negative acknowledgement (NACK) elements are included in the STATUS PDU to be fit to the size of the available radio resource and a value of ACK_SN is set; and send the constructed STATUS PDU to a peer RLC entity.

The related art does not define an operation method in case where an available radio resource is smaller in size than a STATUS PDU to be sent by a receiving side AM RLC, which causes RLC protocols to come in a deadlock situation. The present invention proposes a method for constructing a partial STATUS PDU to allow a transmission of a STATUS PDU even under a situation that a radio resource is not sufficient, so as to enable a stable operation of a protocol regardless of radio circumstances.

The present invention is applied to a mobile communication system, and particularly, to an evolved universal mobile telecommunications system (E-UMTS) evolved from the UMTS. However, the present invention may not be limited to the system, but applicable to any communication system and communication protocol complying with the scope of the present invention.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

Terms containing ordinal numbers such as 1, 2 and the like, may be used to describe various components, but the components may not be limited to the terms. The terms are used for the purpose of distinguishing one component from another component. For example, a first component may be named as a second component without departing from the scope of the present invention, and similarly, the second component may be named as the first component. A term 'and/or' will include a combination of plural associated items or any of plural associated items.

When mentioning that one component is 'connected' or 'accessed' to another component, the one component may be directly connected or accessed to the another component; however, any intermediate component(s) may exists therebetween. On the other hand, when mentioning that one component is 'directly connected' or 'directly accessed' to another component, it could be understood that other intermediate components do not exist therebetween.

Terms used in the present invention are used to illustrate the preferred embodiments, but not intended to limit the present invention. A singular representation may include a plural representation as far as it represents a definitely different meaning from the context. Terms 'include' or 'has' used in the present invention should be understood that they are intended to indicate an existence of feature, number, step, operation, component, item or any combination thereof, disclosed in the specification, but should not be understood that they are intended to previously exclude an existence of one or more other features, numbers, steps, operations, components, or any combination thereof or possibility of adding those things. As far as not being defined differently, all terms used herein including technical or scientific terms may have the same meaning as those generally understood by an ordinary person skilled in the art to which the present invention belongs to. Commonly used terms having the same meanings defined in the dictionary should be construed as having the meanings equal to the contextual meanings. As far as not being definitely defined in the present invention, such terms should not be construed as having ideal or excessively formal meanings.

Hereinafter, description will be given in detail of the preferred embodiments according to the present invention with reference to the accompanying drawings. For the sake of brief description with reference to the drawings, the same or equivalent components regardless of reference numerals will be provided with the same reference numbers, and description thereof will not be repeated.

The present invention allows a transmission of STATUS PDU even when an available radio resource is smaller in size than the STATUS PDU in case where a receiving side RLC sends the STATUS PDU to a transmitting side RLC, so as to prevent a deadlock situation of RLC protocols. To this end, the present invention conceptually defines a new STATUS PDU, and sets ACK_SN according to the construction of the defined STATUS PDU. For the sake of explanation, such STATUS PDU is referred to as 'partial STATUS PDU' or 'short STATUS PDU'. However, the partial STATUS PDU defined in the present invention may not be a STATUS PDU limited by the meaning of 'partial' in a dictionary, but denote that it is smaller than the existing STATUS PDU and has a different function. Meanwhile, in order to distinguish the type of STATUS PDU defined in the present invention and the existing STATUS PDU, the existing STATUS PDU may be referred to as 'first type of STATUS PDU (or normal STATUS PDU), and the STATUS PDU defined in the present invention may be referred to as 'second type of STATUS PDU (or partial STATUS PDU).

Also, the present invention assumes that a receiving side RLC is under a circumstance that it cannot send the existing STATUS PDU to a transmitting side RLC using the current radio resource. Thus, the present invention proposes, in the preferred embodiments, a method for constructing (generating) a so-called partial STATUS PDU, such that a receiving side RLC can send a STATUS PDU using an available radio resource, and allow a transmission of the constructed partial STATUS PDU to a transmitting side RLC.

Hereinafter, a format of status PDU defined in the present invention and fields of the status PDU, namely, ACK_SN field, NACK_SN field and the like, will be described with reference to FIGS. 4 and 5.

FIG. 4 is a format of STATUS PDU currently used in the LTE system. In FIG. 4, a horizontal axis denotes a length of an RLC STATUS PDU with 8 bits, namely, 1 octet.

Each field of the RLC STATUS PDU will now be described.

1. Data/Control (D/C) field: 1 bit. This field indicates whether a corresponding RLC PDU is either RLC data PDU or RLC control PDU.
2. Control PDU type (CPT) field: 3 bits. This field indicates what type a corresponding control PDU is. The RLC control PDU currently defines only the STATUS PDU.
3. Acknowledgement Sequence Number (ACK_SN). Two types of ACK_SN will be defined as follows.
    3.a.1. A type of ACK_SN is an RLC SN of a first PDU whose information is not included in a STATUS PDU.
    3.a.2. Upon receiving the STATUS PDU, a transmitting side determines that all the PDUs among PDUs up to the PDU with ACK_SN-1 have successfully been received by a receiving side, excluding PDUs indicated in the STATUS PDU with NACK_SN or portions of PDUs indicated in the STATUS PDU with NACK_SN, SOstart and SOend.
    3.a.3 Such ACK_SN was applied to embodiments of FIGS. 6 and 8 according to the present invention.
    3.b.1. Another type of ACK_SN is an RLC SN of a first PDU whose information is included in a STATUS PDU.
    3.b.2. Upon receiving the STATUS PDU, the transmitting side determines that all the PDUs among PDUs up to the PDU with the ACK_SN have successfully been by the receiving side, excluding PDUs indicated in the STATUS PDU with NAC_SN or portions of PDUs indicated in the STATUS PDU with NACK_SN, SOstart and SOend.
    3.b.3 Such ACK_SN was applied to embodiments of FIGS. 7 and 9 according to the present invention.
4. Extension 1 (E1): 1 bit. This indicates whether there is another NACK_SN element following a current NACK_SN element (i.e., indicated with NACK_SN or with NACK_SN, SOstart and SOend).
5. NACK_SN (Negative acknowledgement Sequence Number). This is an RLC SN of an unsuccessfully received AMD PDU or AMD PDU segment.
6. Extension 2 (E2): 1 bit. This indicates whether there are SOstart and SOend fields corresponding to a current NACK_SN.
7. Segment Offset Start (SOstart) and Segment Offset End (SOend). These fields are used when only a part (segment) of PDU with NACK_SN is NACK. A first byte of the part corresponds to the SOstart and the last byte thereof corresponds to the SOend.

In the meantime, the receiving side AM RLC cannot always trigger a STATUS PDU, but can trigger a status reporting only when a specific condition is met. Such condition is referred to as 'status reporting trigger', and the LTE system currently uses two conditions as follows.

The first condition is a polling of a transmitting side.

That is, when desiring to receive a status report from a receiving side, the transmitting side AM RLC sets a poll bit for an RLC data PDU for transmission. The receiving side AM RLC then triggers the status report upon receiving the poll bit set RLC data PDU.

The second condition is a detection of an unsuccessful reception of RLC data PDU.

That is, upon detecting an unsuccessfully received RLC data PDU (i.e., AMD PDU or AMD PDU segment) after completing a HARQ reordering, the receiving side AM RLC triggers the status report.

In addition, when the status report is triggered, the receiving side AM RLC sends a reception buffer state to the transmitting side using a STATUS PDU. Here, the STATUS PDU includes information up to the last PDU (=VR(MS)) among PDUs within the range of a PDU (=VR(R)) with a start point of a receiving window to a HARQ reordering completed PDU. Here, the VR(R) and VR(MS) denote state variables, which are managed by the receiving side AM RLC and used for a receiving window, a status report and the like. Among others, the receiving AM RLC manages additional state variables.

Such additional state variables of the receiving side AM RLC are described as follows.

VR(R): Receive state variable.
    It hold a value of a sequence number (SN) of an AMD PDU subsequent to the last AMD PDU among AMD PDUs received in-sequence.
    It is a first AMD PDU among AMD PDUs which are not completely (successfully) received by the receiving side AM RLC.
    It serves as the lower edge of the receiving window.
    It is initially set to 0. When completely receiving an AMD PDU with SN=VR(R), it is updated to a value of SN of a first incompletely received AMD PDU subsequent to the AMD PDU.
VR(MR): Maximum acceptable receive state variable.
    It holds a value of SN of the first AMD PDU among AMD PDUs outside a receiving window.
    It serves as the higher edge of the receiving window.
    It is updated, for example, to VR(MR)=VR(R)+AM_Window_size when the VR(R) is updated.

VR(X): T_reordering state variable

It holds a value of SN of an RLC data PDU subsequent to an RLC data PDU which triggered a T_reordering as a timer for managing a HARQ reordering.

A receiving side AM RLC drives the T_reordering upon receiving an out-of-sequence RLC data PDU under a condition that no T_reordering is triggered, and sets the VR(X) to the value of SN of an RLC data PDU subsequent to the RLC data PDU.

VR(MS): Maximum status transmit state variable

This state variable is used for including in a STATUS PDU information only related to RLC data PDUs for which the HARQ reordering is completed.

It is initially set to 0, and upon completely receiving an AMD PDU with SN=VR(MS), it is updated to a value of SN of a first incompletely received AMD PDU following the AMD PDU.

Upon the T_reordering expired, it is updated to a value of SN of a first incompletely received AMD PDU among AMD PDUs higher than VR(X). ACK_SN is set to the VR(MS) so as to construct a STATUS PDU.

VR(H): highest received state variable

It holds a value of the very next SN of the highest SN among RLC data PDUs received by the receiving side AM RLC, namely, a value of SN of an RLC data PDU which is first unsuccessfully received by the receiving side AM RLC.

It is initially set to 0, and upon receiving an RLC data PDU higher than VR(H), it is updated to a value of SN of an RLC data PDU subsequent to the RLC data PDU.

Figure 5:
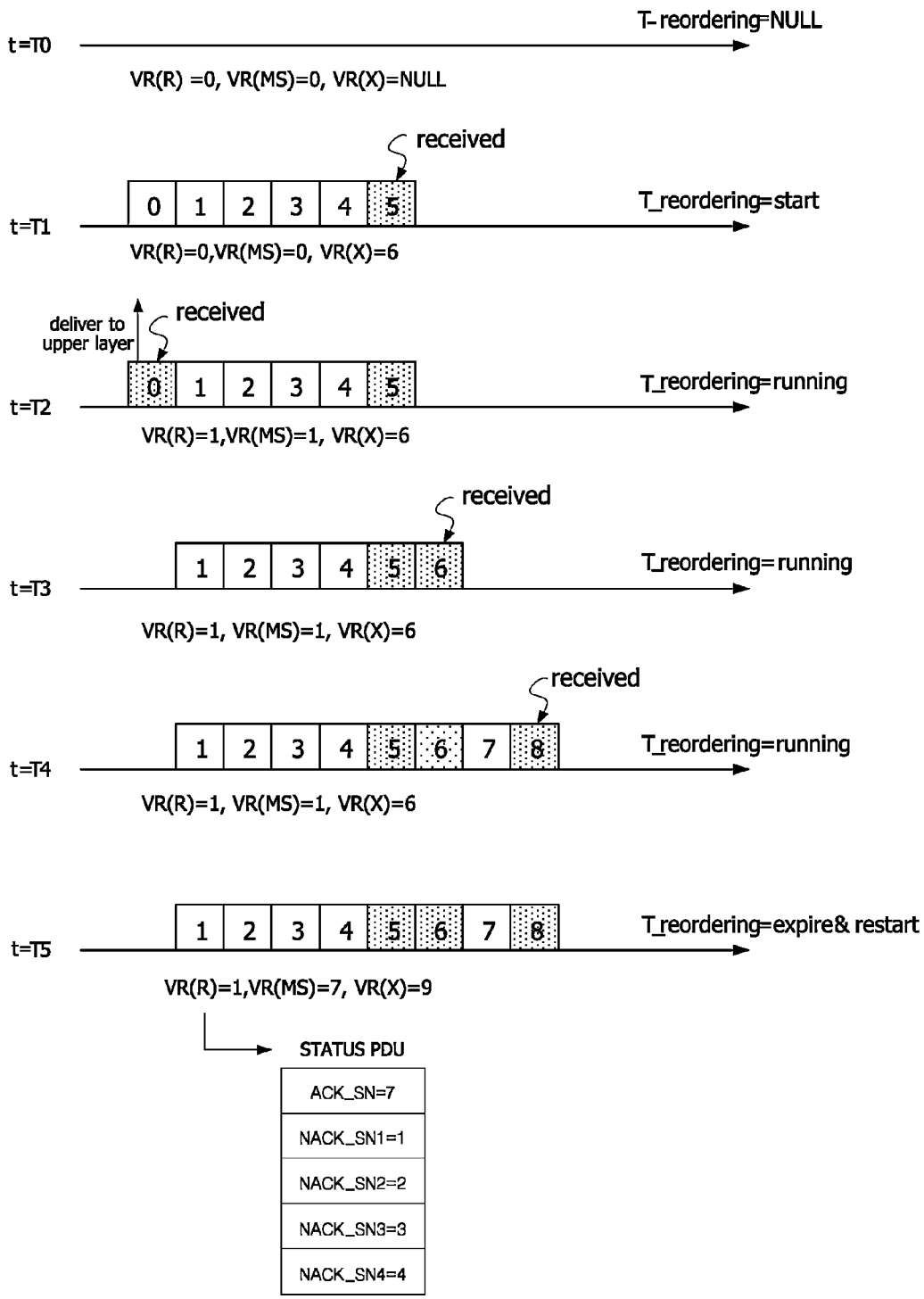
FIG. 5 illustrates an exemplary construction of STATUS PDU in the LTE system.

FIG. 5 illustrates an exemplary construction of a STATUS PDU in the LTE system, which illustrates an exemplary status report triggering, considering an HARQ reordering of the LTE system. Here, for the sake of description, an AMD PDU segment is not considered in FIG. 5. Referring to FIG. 5, when t=T1, it is assumed that VR(R)=0, VR(X)=6 and VR(MX)=0. In FIG. 5, data (AMD PDU) received at each time t is shadowed (i.e., received), and reception failure is data of non-shadowed portions.

t=T0: initial state

A receiving side AM RLC is in the initial state after the entity generation.

All the state variables have initial values.

t=T1: AMD PDU 5 is received

Upon receiving the AMD PDU 5 out of sequence, VR(X) is updated to 6 (i.e., VR(X)=6) and T_reordering is started.

Since an AMD PDU 0 has not been received, VR(R)=0 and VR(MS)=0 are maintained.

t=T2: the AMD PDU 0 is received

Upon receiving the AMD PDU 0 which is AMD PDU with VR(R)=VR(MS), VR(R) and VR(ms) are all updated to 1, and the AMD PDU 0 is delivered to an upper layer.

VR(X)=6 is maintained and T_reordering is continuously run.

t=T3: AMD PDU 6 is received

Even if the AMD PDU 6 is received, VR(R), VR(MS) and VR(X) are under the same states as in t=T2 without a change.

t=T4: AMD PDU 8 is received

Even if the AMD PDU 8 is received, VR(R), VR(MS) and VR(X) are under the same states as in t=T3 without a change.

t=T5: T_reordering expires

When the T_reordering expires, VR(MS) is updated to an AMD PDU 7, which is a first incompletely received AMD PDU among AMD PDUs higher than VR(X).

A STATUS PDU is constructed as shown in FIG. 5 for transmission, based upon information on PDUs within the range of VR(R)=1 to VR(MS)=7.

T_reordering is restarted when an AMD PDU which is higher than the updated VR(MS) has been received. Accordingly, VR(X) is updated to 9 (i.e., VR(X)=9) and T_reordering is restarted.

A transmitting side AM RLC having received the STATUS PDU, as shown in FIG. 5, interprets a reception buffer state as follows.

Unsuccessfully transmitted AMD PDUs are 1, 2, 3 and 4.

Since ACK_SN=7, AMD PDUs 0, 5 and 6, which are not NACK among AMD PDUs 0 to 6, have successfully been transmitted.

VT(A), which is a state variable serving as a start point of a transmitting window, is updated from 0 to 1. VT(A) holds a SN of a subsequent AMD PDU for which ACK should first be received in sequence.

Figure 6:
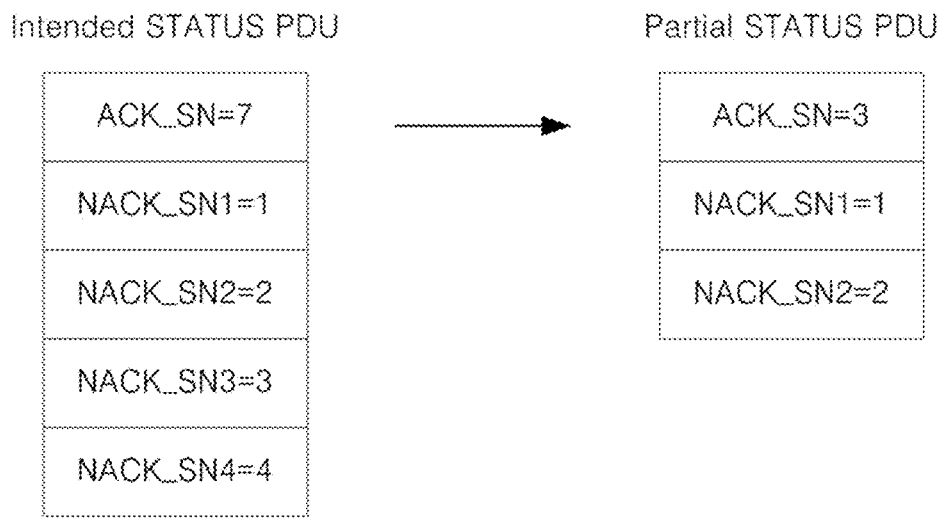
FIG. 6 illustrates a construction of a partial STATUS PDU in accordance with a first exemplary embodiment of the present invention.

FIG. 6 illustrates a construction of a partial STATUS PDU in accordance with a first exemplary embodiment of the present invention. Here, the first exemplary embodiment of FIG. 6 is described under the assumption that data has been received, as shown in FIG. 5, and also a receiving side RLC is able to send two NACK_SN elements to a transmitting side RLC using a currently available radio resource. That is, like the STATUS PDU shown in FIG. 5, a STATUS PDU to be sent from the receiving side RLC to the transmitting side RLC matches with an intended STATUS PDU of FIG. 6. However, the receiving side RLC is under the state that it cannot send such STATUS PDU to the transmitting side RLC using the currently available radio resource. Therefore, a partial STATUS PDU according to the present invention shown in FIG. 6 is constructed.

The first embodiment of FIG. 6 illustrates that NACK information as much as being transmittable by an available radio resource, not information up to VR(MS), is included in a STATUS PDU for transmission. It is summarized as follows; ① NACK_SNs are included as many as being transmittable by an in-sequence given radio resource, and ② ACK_SN is not necessarily set to VR(MS), but set to a random value capable of including the NACK_SNs within the range of VR(R)≤SN≤VR(MS). For example, if the first embodiment of FIG. 6 is applied to the STATUS PDU of FIG. 5, as the random values, only two NACK_SN elements (i.e., NACK_SN1 and NACK_SN2) can sequentially be included in the partial STATUS PDU, as shown in FIG. 6.

Hereinafter, an operation performed between the transmitting side AM RLC and receiving side AM RLC will be described in more detail with reference to the first embodiment of FIG. 6.

1. When a receiving side AM RLC constructs STATUS PDU, 1-1) the receiving side AM RLC considers an included NACK_SN list, to set ACN_SN to a random value within the range of VR(R)≤SN≤VR(MS), such that the total size of the STATUS PDU cannot be greater than a given radio resource. The newly set ACK_SN value may depend on a capability of a currently available radio resource of the receiving side RLC. In more detail, the ACK SN is set to one (e.g., set to ACK_SN=3 of FIG. 6) within the range of (the last NACK_SN included in the STATUS PDU, namely, NACK_SN2 of FIG. 6)≤SN≤(the first NACK_SN not included in the STATUS PDU, namely, NACK_SN3 of FIG. 6). Accordingly, NACK_SNs to be desirably included can be included in the partial STATUS PDU.
1-2) NACK_SN1 as the first NACK_SN is set to VR(R).
1-3) SNs of all the unsuccessfully received PDUs, among PDUs within the range of NACK_SN1<SN≤ACK_SN, are set to NACK_SN elements in an increasing SN order (i.e., NACK_SN1 and NACK_SN2 of FIG. 6).
2. When the transmitting side AM RLC receives the partial STATUS PDU,
2-1) the transmitting side AM RLC determines that PDUs within the range of VT(A)≤SN<NACK_SN1 have successfully been sent.
2-2) PDUs with NACK_SN, among PDUs within the range of NACK_SN1≤SN<ACK_SN, are determined to be unsuccessfully sent.
2-3) PDUs not with NACK_SN, among PDUs within the range of NACK_SN1≤SN<ACK_SN, are determined to be successfully sent.
2-4) VT(A) is set to NACK_SN1.

The first embodiment of FIG. 6 illustrates a method of sequentially including NACK_SN elements in a STATUS PDU as much as being loadable for transmission. That is, as shown in FIG. 6, among four unsuccessfully received NACK_SN elements (i.e., NACK_SN1 to NACK_SN4), two NACK_SN elements (i.e., NACK_SN1 and NACK_SN2) are sequentially sent by using a currently available radio resource. The first embodiment of FIG. 6 is advantageous in that even if the receiving side does not inform all the information required by the transmitting side, maximum status information to be fit to a current radio resource circumstance can be sent. The transmitting side and the receiving side perform the same RLC operations as the related art excluding the difference that ACK_SN is set to a random value other than VR(MS).

In the meantime, the NACK_SN element in the description may actually be NACK_SN itself, or be a set including NACK_SN, SOstart and SOend considering segments.

Figure 7:
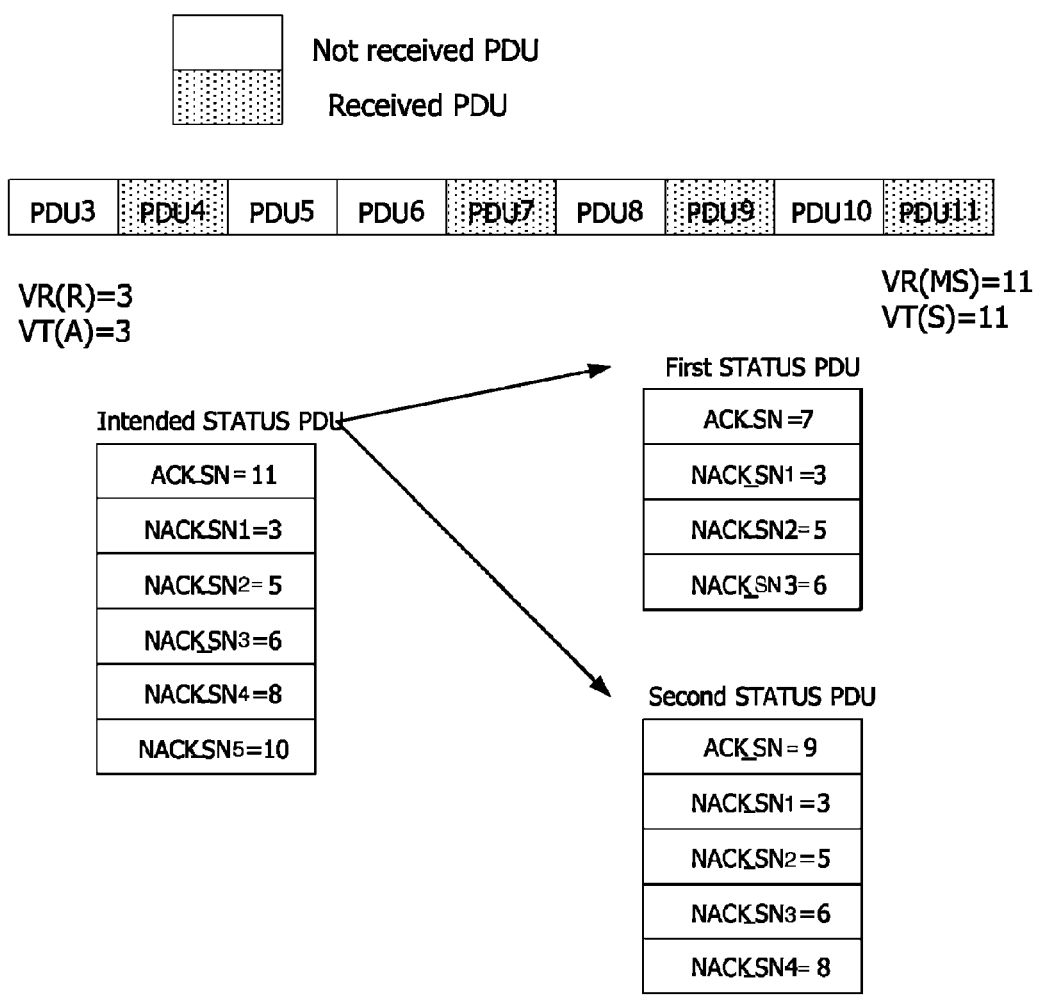
FIG. 7 illustrates another exemplary construction of a partial STATUS PDU in accordance with the first embodiment of the present invention.

FIG. 7 illustrates another exemplary construction of the partial STATUS PDU in accordance with the first embodiment of the present invention, which illustrates that status PDUs are sent from a receiving side RLC entity to a transmitting side RLC entity using first and second STATUS PDUs, considering an available radio resource.

However, a value of ACK_SN of FIG. 7 is different from that defined in FIG. 6.

That is, explaining the ACK_SN of FIG. 7, an ACK_SN field indicates an RLC SN of a first PDU whose information is included in STATUS PDU. That is, when receiving the STATUS PDU, the transmitting side interprets that all AMD PDUs up to and including the AMD PDU with SN=ACK_SN have been received by its peer AM RLC entity, excluding those AMD PDUs indicated in the STATUS PDU with NACK_SN and portions of AMD PDUs indicated in the STATUS PDU with NACK_SN, SOstart and SOend.

ACK_SN may not be set to the same value to that of VR(MS) (i.e., VR(MS)=11). The ACK_SN is set to 7 (ACK_SN=7) (i.e., the next value of NACK_SN3=6) for a first STATUS PDU. The first STATUS PDU includes three (indicating the size of a currently available radio resource) of unsuccessfully received AMD PDUs (i.e., SN=3, 5 and 6), namely, NACK_SN1=3, NACK_SN2=5 and NACK_SN3=6. The ACK_SN is set to 9 (i.e., the next value of NACK_SN4=8) for a second STATUS PDU. The second STATUS PDU includes four (indicating the size of a currently available radio resource) of unsuccessfully received AMD PDUs (i.e., SN=3, 5, 6 and 8), namely, NACK_SN1=3, NACK_SN2=5, NACK_SN3=6 and NACK_SN4=8. In particular, comparing the embodiments of FIGS. 6 and 7, the transmitting side determines in the embodiment of FIG. 7 that the receiving side has correctly received PDUs up to the PDU with ACK_SN, whereas the transmitting side determines in the embodiment of FIG. 6 that the receiving side has correctly received PDUs up to the PDU with ACK_SN-1.

Figure 8:
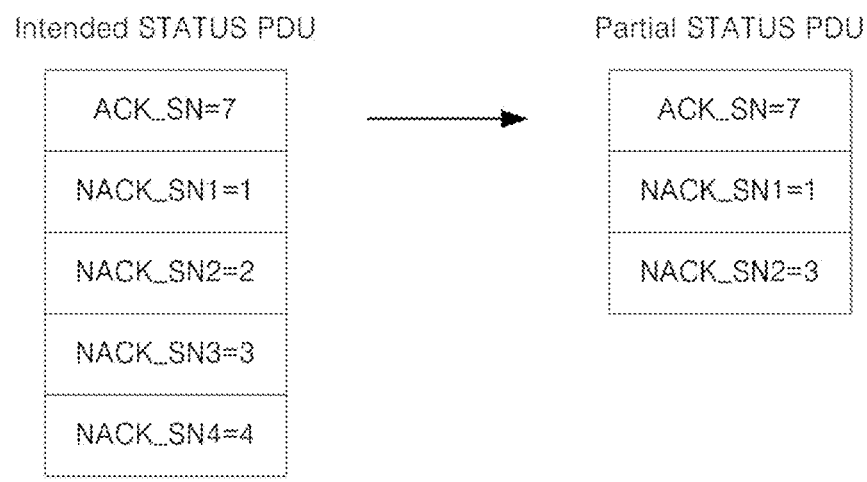
FIG. 8 illustrates a construction of STATUS PDU in accordance with a second embodiment of the present invention.

FIG. 8 illustrates a construction of a STATUS PDU in accordance with a second embodiment of the present invention, which illustrates how to construct a partial STATUS PDU without including part of NACK_SN elements. Here, the second embodiment of FIG. 8 is under the assumption that data has been received as shown in FIG. 5, and also a receiving side RLC can send two NACK_SN elements to a transmitting side RLC by using a currently available radio resource. That is, like the STATUS PDU of FIG. 5, a STATUS PDU which the receiving side RLC is to send to the transmitting side RLC is the same as an intended STATUS PDU of FIG. 8. However, the receiving side RLC is under the circumstance that it cannot send the entire STATUS PDU to the transmitting side RLC using the currently available radio resource. Hence, the partial STATUS PDU of FIG. 8 according to the present invention is constructed. Hereinafter, an exemplary operation between the transmitting side AM RLC and the receiving side AM RLC will be described with reference to FIG. 8. The second embodiment of FIG. 8 illustrates how to construct a STATUS PDU without including portions of NACK_SN elements (e.g., indicated with NACK_SN or with NACK_SN, SOstart and SOend) in order to fit the size of the STATUS PDU to an available radio resource. Here, the ACK_SN may be set to VR(MS) as done in the related art. The STATUS PDU shown in FIG. 8 may be constructed when only two NACK_SN elements can be included in the STATUS PDU because an available radio resource is not sufficient in the embodiment of FIG. 6.

The operation between the transmitting side AM RLC and the receiving side AM RLC in the second embodiment of the present invention is described as follows:
1. When the receiving side AM RLC constructs a STATUS PDU,
1-1) ACK_SN is set to VR(MS).
1-2) NACK_SN1 as a first NACK_SN is set to VR(R).
1-3) Some of SNs of unsuccessfully received PDUs are selected among PDUs within the range of NACK_SN1<SN<ACK_SN to be fit into a given radio resource, so as to construct a NACK_SN list. It is assumed in FIG. 7 that two NACK_SN elements can be sent by using the available radio resource, and thus NACK_SN2=3 is selected.
2. When the transmitting side AM RLC receives the STATUS PDU,
2-1) PDUs within the range of VT(A)≤SN<NACK_SN1 are determined to be successfully sent.
2-2) PDUs with NACK_SN among PDUs within the range of NACK_SN1≤SN<ACK_SN are determined to be unsuccessfully sent.
2-3) PDUs not with NACK_SN among PDUs within the range of NACK_SN1≤SN<ACK_SN are determined to be unknown as to whether or not they are correctly sent.
2-4) VT(A) is set to NACK_SN1.

The second embodiment according to the present invention is implemented in order for a receiving side to inform the transmitting side of up to which PDU it has actually received, by setting ACK_SN to VR(MS) (i.e., ACK_SN=7 in FIG. 8) as shown in the related art. Also, the NACK_SN list is constructed by selecting some of PDUs with NACK_SN. Accordingly, in order to avoid a wrong determination of the transmitting side, the receiving side always sets NACK_SN1 to VR(R) upon the construction of the STATUS PDU, and the transmitting side determines to be unknown, not ACK, as to whether PDUs not with NACK_SN have successfully been sent.

Here, since the transmitting side determines that PDUs within the range of VT(A)≤SN<NACK_SN1 have correctly been sent, if the NACK_SN1 is set to a value greater than the VR(R), a start point of a transmitting window moves to an SN greater than SN of an unsuccessfully sent PDU such that the transmitting side does not retransmit the unsuccessfully sent PDU. Hence, the NACK_SN1 is set to VR(R).

In addition, in order to avoid the determination that NACK_SNs not included in the NACK_SN list are ACK because an available radio resource is not sufficient, the transmitting side does not determine that whether the PDUs not with NACK_SN are ACK among PDUs within the range of NACK_SN1≤SN<ACK_SN is successfully sent. In the description, the NACK_SN element may actually be NACK_SN itself. Alternatively, the NACK_SN element may be a set including NACK_SN, SOstart and SOend.

Figure 9:
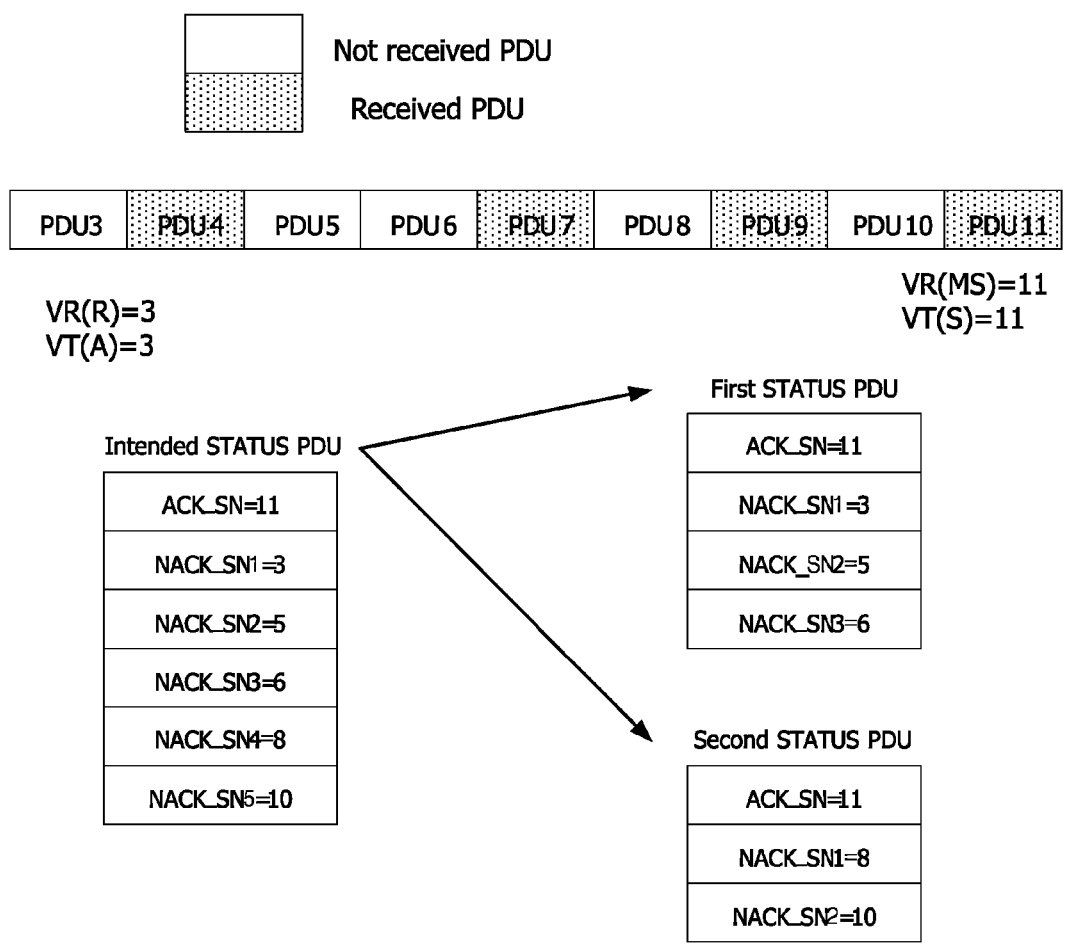
FIG. 9 illustrates another exemplary construction of partial STATUS PDU in accordance with a second embodiment of the present invention.

FIG. 9 illustrates another exemplary construction of the partial STATUS PDU in accordance with the second embodiment of the present invention, which illustrates that a receiving side RLC entity sends status PDUs to a transmitting side RLC entity using first and second STATUS PDUs by considering an available radio resource. Here, in this construction, a value of ACK_SN in FIG. 9 is different from that defined in FIG. 8. The ACK_SN of FIG. 9 is the same as that described in FIG. 7. Referring to FIG. 9, a value of VR(MS) (i.e., VR(MS)=11) is set to a value of ACK_SN (i.e., ACK_SN=11), and the first STATUS PDU includes three (indicating the size of a currently available radio resource) of unsuccessfully received AMD PDUs (i.e., SN=3, 5 and 6), namely, NACK_SN1=3, NACK_SN2=5 and NACK_SN3=6. The second STATUS PDU includes two (indicating the size of a currently available radio resource) of unsuccessfully received AMD PDUs (i.e., SN=8 and 10), namely, NACK_SN1=8 and NACK_SN2=10. In particular, comparing the embodiments of FIGS. 9 and 8, the transmitting side determines in FIG. 9 that the receiving side has correctly received up to a PDU with ACK_SN, whereas the transmitting side determines in FIG. 8 that the receiving side has correctly received up to a PDU with ACK_SN-1.

A third embodiment according to the present invention illustrates that normal STATUS PDU and partial STATUS PDU are distinguished by a control PDU type (CPT) field for transmission. Here, 'normal' of the normal STATUS PDU is not limited to the meaning in the dictionary but is a term used to distinguish the normal STATUS PDU from the partial STATUS PDU defined in the present invention.

3-bit CPT field exists in a header of an RLC control PDU, so as to inform the type of the corresponding control PDU. However, only one type of STATUS PDU has been defined so far. Therefore, only CPT=000 is used and the other values are not used. That is, the third embodiment according to the present invention can use the CPT field to indicate the normal STATUS PDU for CPT=000 and to indicate the partial STATUS PDU for CPT=001, for example.

The third embodiment according to the present invention illustrates that a partial STATUS PDU is added as a type of control PDU and a CPT field is used to identify it. That is, when a radio resource is sufficient, the existing normal STATUS PDU is sent, and when the size of radio resource is smaller than the normal STATUS PDU, the partial STATUS PDU is send. Upon receiving a control PDU, the transmitting side uses the CPT field to identify whether the received control PDU is the normal STATUS PDU or the partial STATUS PDU, and operates accordingly.

On the other hand, in case where the transmitting side is a network, it is important to identify whether a received STATUS PDU is normal STATUS PDU or partial STATUS PDU because the network manages the allocation of radio resources to a terminal. That is, upon receiving the partial STATUS PDU from the terminal, the network determines that the terminal has insufficient radio resources allocated. Accordingly, the network may allocate more radio resources to the terminal in the next allocation, so as to enable an effective operation.

In the meantime, the third embodiment using the CPT field can be applied to the first and second embodiments of the present invention. That is, when the CPT field of the third embodiment is used for the partial STATUS PDU of the first embodiment, a transmitting side having received the partial STATUS PDU including the CPT field (e.g., for CPT=001) determines (analyzes) that a receiving side has not included all the NACK_SNs (i.e., PDUs unsuccessfully received by the receiving side) in the partial STATUS PDU due to the insufficient radio resources. Hence, the transmitting side can effectively deal with the case of retransmitting unsuccessfully sent PDUs.

Also, when the CPT field of the third embodiment is used for the partial STATUS PDU of the second embodiment, the transmitting side also determines (analyzes) based upon the set value of the CPT field that the receiving side has not included all the NACK_SNs (i.e., PDUs unsuccessfully received by the receiving side) in the partial STATUS PDU. In particular, in this case, the transmitting side determines to be unknown as to whether PDUs not with NACK_SN are successfully sent, and should continuously store the corresponding PDUs in its buffer.

A receiver according to the present invention may include a module for constructing a STATUS PDU described in the first and second embodiments of the present invention.

The module according to the present invention may check a currently available radio resource and construct the STATUS PDU by considering an available radio resource. The module includes NACK elements in the STATUS PDU to be fit to the available radio resource, and sets a value of ACK_SN. Here, the module may perform the setting operation as shown in the first and second embodiments upon setting the ACK_SN.

The module then sends the STATUS PDU constructed to be fit to the available radio resource to its peer RLC entity.

The receiver according to the present invention basically includes, in addition to the aforesaid component, software and hardware required for implementing the scope of the present invention, for example, an output device (e.g., display, speaker and the like), an input device (e.g., keypad, microphone and the like), a memory, a transceiver (e.g., RF module, antenna and the like). Such components can be obviously understood by those skilled in the art, and thus a detailed description thereof will not be repeated.

Meanwhile, the method according to the present invention, as described so far, can be implemented by hardware or software, or any combination thereof. For example, the method according to the present invention may be stored in a storage medium (e.g., an internal memory of a mobile terminal, a flash memory, a hard disc, etc.). Alternatively, the method according to the present invention can be implemented as codes or command words within a software program capable of being executed by a processor (e.g., a microprocessor in a mobile terminal).

The present invention has been explained with reference to the embodiments which are merely exemplary. It will be apparent to those skilled in the art that various modifications and equivalent other embodiments can be made in the present invention without departing from the spirit or scope of the invention. Also, it will be understood that the present invention can be implemented by selectively combining the aforementioned embodiment(s) entirely or partially. Thus, it is intended that the present invention cover modifications and variations of this invention provided they come within the scope of the appended claims and their equivalents.

The invention claimed is:

1. A method for constructing a status protocol data unit (PDU) for providing a positive acknowledgement (ACK) and a negative acknowledgement (NACK) of acknowledged mode data (AMD) PDUs of radio link control (RLC) PDUs or portions of the RLC PDUs in a mobile communications system, the method comprising:
    receiving, by a device, size information on a total size of at least one RLC PDU;
    constructing, by the device, a status PDU for AMD PDUs by considering the total size of the at least one RLC PDU, the status PDU including sequence numbers that include a sequence number (SN) of a receive state variable and at least one sequence number between the sequence number of the receive state variable and a sequence number of a maximum status transmit state variable such that the constructed status PDU includes following sequence: an Acknowledgement Sequence Number (ACK SN) to indicate the maximum status transmit state variable followed by a first Negative Acknowledgement Sequence Number (NACK SN) for a first AMD PDU of the AMD PDUs followed by a NACK_SN element, the NACK_SN element comprising a second NACK_SN, a segment offset start (SOstart) and a segment offset end (SOend) for a partly received AMD PDU of the AMD PDUs; and
    transmitting, by the device, the constructed status PDU.

2. The method according to claim 1, wherein the NACK_SN element is one of a plurality of NACK_SN elements included in the status PDU in increasing sequence number order.

3. The method according to claim 2, wherein the ACK_SN is set to a sequence number of a next not completely received AMD PDU which is not indicated with any NACK_SN in the status PDU.

4. The method according to claim 2, wherein the plurality of NACK SN elements are included in the status PDU in the increasing sequence number order from a first not received AMD PDU or a first not received AMD PDU portion up to a certain not received AMD PDU such that the constructed status PDU fits to the total size of the at least one RLC PDU.

5. The method according to claim 4, wherein the first not received AMD PDU or the first not received AMD PDU portion does not exist between two consecutive not received PDUs.

6. The method according to claim 4, wherein the first not received AMD PDU or the first not received AMD PDU portion exists between two consecutive not received PDUs.

7. The method according to claim 1, wherein the total size of the at least one RLC PDU is indicated by a lower layer.

8. The method according to claim 1, wherein if the status PDU is a partial status PDU, the partial status PDU includes an indicator to indicate that the status PDU is the partial status PDU.

9. A device configured to construct a status protocol data unit (PDU) for providing a positive acknowledgement (ACK) and a negative acknowledgement (NACK) of acknowledged mode data (AMD) PDUs of radio link control (RLC) PDUs or portions of the RLC PDUs in a mobile communications system, the device comprising:
    a transceiver configured to receive size information on a total size of at least one RLC PDU;
    a processor configured to construct a status PDU for AMD PDUs by considering the total size of the at least one RLC PDU, the status PDU including sequence numbers that include a sequence number (SN) of a receive state variable and at least one sequence number between the sequence number of the receive state variable and a sequence number of a maximum status transmit state variable such that the constructed status PDU includes following sequence: an Acknowledgement Sequence Number (ACK SN) to indicate the maximum status transmit state variable followed by a first Negative Acknowledgement Sequence Number (NACK SN) for a first AMD PDU of the AMD PDUs followed by a NACK_SN element, the NACK_SN element comprising a second NACK_SN, a segment offset start (SOstart) and a segment offset end (SOend) for a partly received AMD PDU of the AMD PDUs; and
    the transceiver configured to transmit the constructed status PDU.

10. The device according to claim 9, wherein the NACK_SN element is one of a plurality of NACK_SN elements included in the status PDU in increasing sequence number order.

11. The device according to claim 10, wherein the ACK_SN is set to a sequence number of a next not completely received AMD PDU which is not indicated with any NACK_SN in the status PDU.

12. The device according to claim 10, wherein the plurality of NACK SN elements are included in the status PDU in the increasing sequence number order from a first not received AMD PDU or from a first not received AMD PDU portion up to a certain not received AMD PDU such that the constructed status PDU fits to the total size of the at least one RLC PDU.

13. The device according to claim 12, wherein the first not received AMD PDU or the first not received AMD PDU portion does not exist between two consecutive not received PDUs.

14. The device according to claim 12, wherein the first not received AMD PDU or the first not received AMD PDU portion exists between two consecutive not received PDUs.

15. The device according to claim 9, wherein the total size of the at least one RLC PDU is indicated by a lower layer.

16. The device according to claim 9, wherein if the status PDU is a partial status PDU, the partial status PDU includes an indicator to indicate that the status PDU is the partial status PDU.

* * * * *